United States Patent [19]

Blad

[11] 4,126,659

[45] Nov. 21, 1978

[54] METHOD OF MAKING A HOLLOW ARTICLE

[75] Inventor: Leiv H. Blad, Van Nuys, Calif.

[73] Assignee: Lockheed Aircraft Corporation, Burbank, Calif.

[21] Appl. No.: 703,856

[22] Filed: Jul. 9, 1976

[51] Int. Cl.² ............................................. B29C 17/06
[52] U.S. Cl. ........................................ 264/90; 156/80;
156/189; 249/62; 249/65; 264/137; 264/220;
264/314; 264/316; 264/317; 425/DIG. 14
[58] Field of Search .................. 264/314, 313, 317, 28,
264/DIG. 44, 90, 136, 137, 220, 316; 249/61,
62, 65; 425/DIG. 12, DIG. 14; 156/80, 189

[56] References Cited

U.S. PATENT DOCUMENTS

| 1,394,997 | 10/1921 | Lake | 264/317 |
| 2,739,350 | 3/1956 | Lampman | 264/313 |
| 3,764,641 | 10/1973 | Ash | 264/314 X |
| 3,962,393 | 6/1976 | Blad | 264/314 X |
| 3,962,394 | 6/1976 | Holl | 264/313 X |
| 3,973,749 | 8/1976 | Friedl | 249/65 |

Primary Examiner—Thomas P. Pavelko
Attorney, Agent, or Firm—Lowell G. Turner

[57] ABSTRACT

The invention relates to a method and apparatus for making hollow, resin-impregnated fibrous fabric articles. Specifically, it relates to a method wherein a reusable mandrel is made sufficiently rigid to receive a lay-up of the article to be manufactured. The rigidized assembly is placed within a female mold, derigidized and expanded to apply pressure from within, thereby forcing the lay-up against the interior of the mold. Heat is applied to cure the resin, producing an article having a very high degree of dimensional accuracy.

22 Claims, 6 Drawing Figures

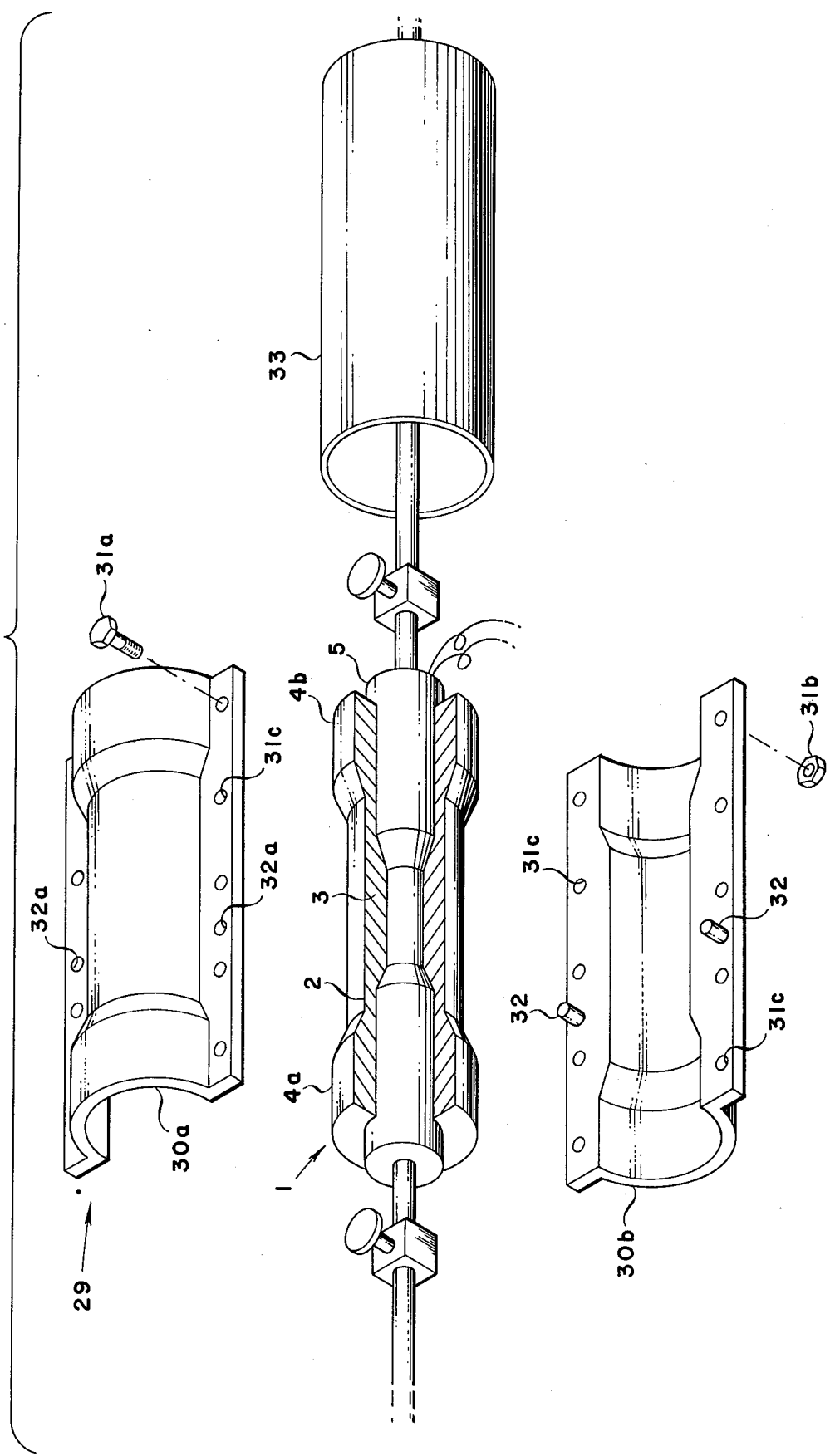

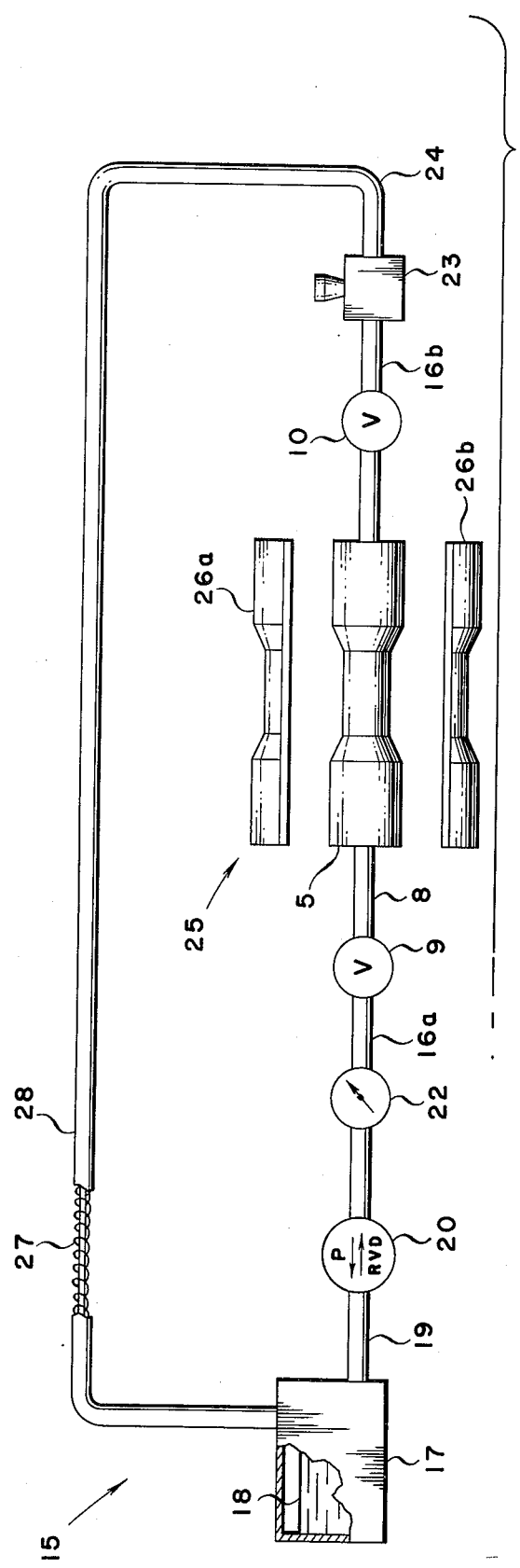
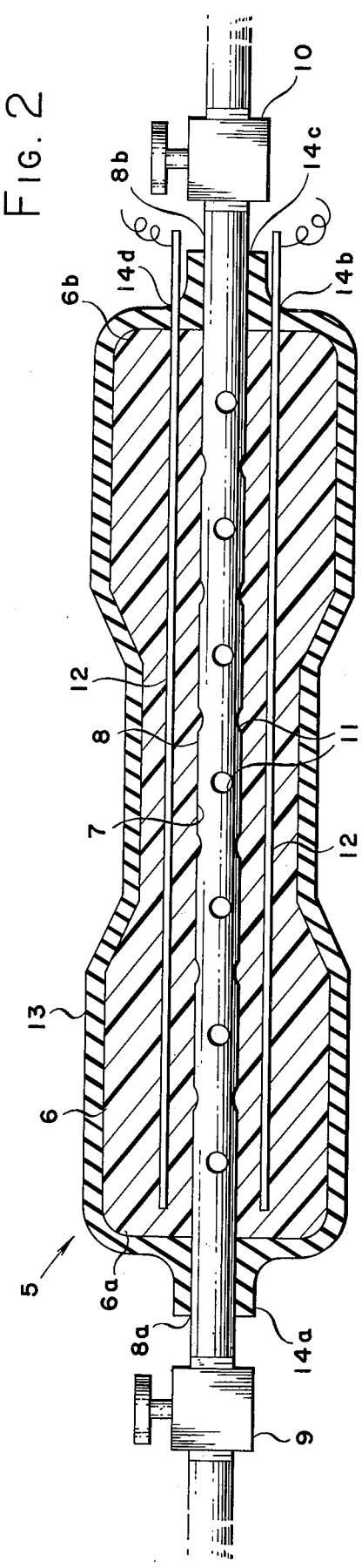
FIG. 3
FIG. 2

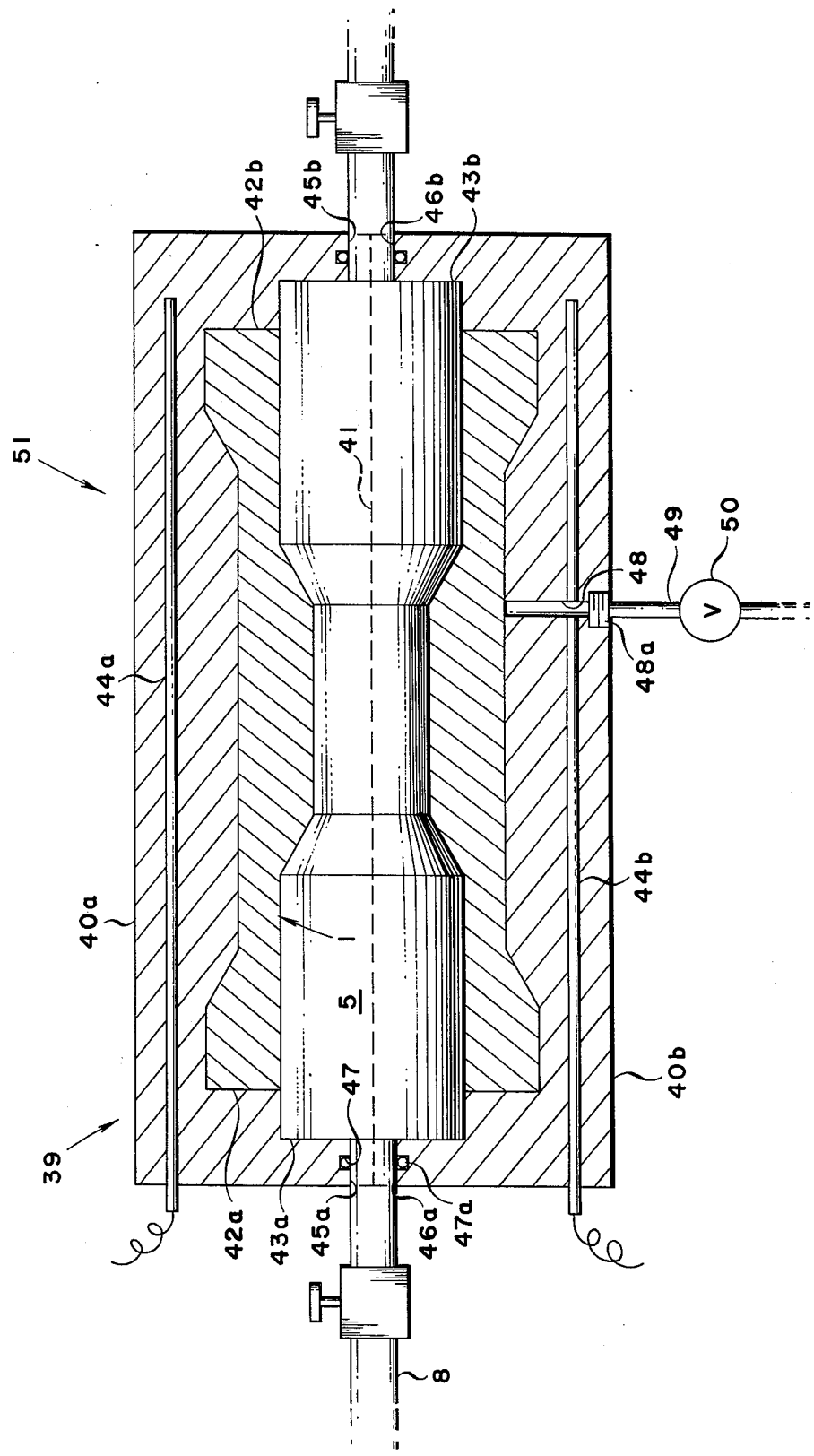

METHOD OF MAKING A HOLLOW ARTICLE

BACKGROUND AND SUMMARY OF THE INVENTION

Prior art methods of making hollow, resinimpregnated fibrous articles are expensive, time consuming, laborious to use and have poor dimensional accuracy. In addition, the tools could be easily damaged requiring constant repair. For example, in methods using plaster of paris mandrels, the mandrel is first poured in a separate mold. The resin impregnated fibrous material is then layed up on the plaster mandrel and the material is covered with a tape that shrinks as the temperature is increased. During the oven cure the force exerted on the material varies depending upon how uniformly the tape was applied. Also, variations in the cure temperature and compressive load induced by the shrinking tape cause variations in the surface finish of the cured article. After curing, the plaster mandrel is removed from the article by breaking it into small pieces, using a hammer, chisel, or by drilling. This is a tedious, time consuming and costly operation without assurance that the article itself will not be damaged. Furthermore, if the article being formed is long and thin, the plaster mandrel becomes so delicate that extreme care is necessary to handle it. A new mandrel must be formed and destroyed for each part.

Another method uses an inflatable-collapsible mandrel which is first inflated to the internal dimensions of the article to be manufactured, over which the resinimpregnated fibrous material is layed up. Using this type of mandrel, the layup cannot be applied by a filament winding operation because the high compression loads caused by the filament or tape tend to deform the mandrel. Furthermore, since the mandrel is inflated with a gaseous medium, the mandrel does not maintain an exact shape during curing of the article. This results in a loss of dimensional accuracy. Often, because of the drawbacks of these prior methods, local external or internal reinforcements are layed up and cured in separate steps. This greatly increases the cost of the part. Some configurations are completely impractical to manufacture by prior methods.

BRIEF DESCRIPTION OF THE INVENTION

The present invention is a method for making a resin-impregnated hollow article. A reusable imperviously coated expandable mandrel is formed and placed into a mold. A liquid medium is introduced into the interior of the mandrel through the pressurization means and solidified, rigidizing the mandrel. The mandrel is removed from the mold, resin-impregnated fabric plies are layed up on the rigid mandrel and the assembly is introduced into a rigid, pressure-resistant envelope. A flexible cover is placed over the envelope and sealed to the rigidized mandrel to form a container and a vacuum is drawn on the container. The solidified medium is then liquified, removed from the mandrel and the assembly is placed into an autoclave. The autoclave temperature and pressure are raised, pressurizing the mandrel through the pressurization means, forcing the layup against the interior surfaces of the envelope and curing the plies. The cover and envelope are next removed and a vacuum is drawn on the mandrel through the pressurization means, causing it to collapse. Thereafter the mandrel is removed from within the article.

The envelope may contain integral heating elements such that, after the rigidized mandrel with layup thereon is placed in the envelope, the heating elements are activated, the mandrel is derigidized, and the mandrel is pressurized, forcing the layup against the interior surfaces of the envelope and curing the plies.

This invention overcomes the detrimental production problems mentioned and provides a novel, unique and improved method of making a hollow, resin-impregnated fibrous fabric article. It is, therefore, an important feature of this invention to provide a method of making an article with external reinforcements or internal reinforcements, or both, wherein the layup is accomplished in what may be termed a one step operation.

Another important object of this invention is to provide a reusable mandrel for fabricating resin-impregnated fibrous articles.

Another object is to provide a mandrel that can be rigidized during the layup of the article, making it suitable for use with filament or tape winding apparatus.

Other objects of invention include: providing a method using easily manipulatable tools that are not easily damaged; a method for applying a uniform internal pressure on the article during curing, thereby producing an article with a high degree of dimensional accuracy; a method of producing hollow, resin-impregnated fibrous fiber articles by first rigidizing a mandrel upon which the article is layed up thereon, placing the article and mandrel in a rigid envelope, forming an airtight container around the envelope and article and pulling a vacuum on the container, derigidizing the mandrel and curing while applying pressure from within; and providing a method for producing hollow, resin-impregnated fibrous fabric articles by the use of self-contained reusable tooling.

These and other objects of the invention will become more apparent by a full and complete reading of the following description together with the drawings and the Claims thereto.

DESCRIPTION OF DRAWINGS

FIG. 1 is an exploded perspective of an article layed up over the rigidized mandrel with the envelope and cover ready for installation;

FIG. 2 is a cross-sectional view of the mandrel with pressurization means installed;

FIG. 3 is a schematic of the mandrel rigidization system;

FIG. 5 is a cross-sectional view of an article layed up on a rigidized mandrel installed in an envelope having integral heaters.

DETAILED DESCRIPTION OF INVENTION

Figure 6:
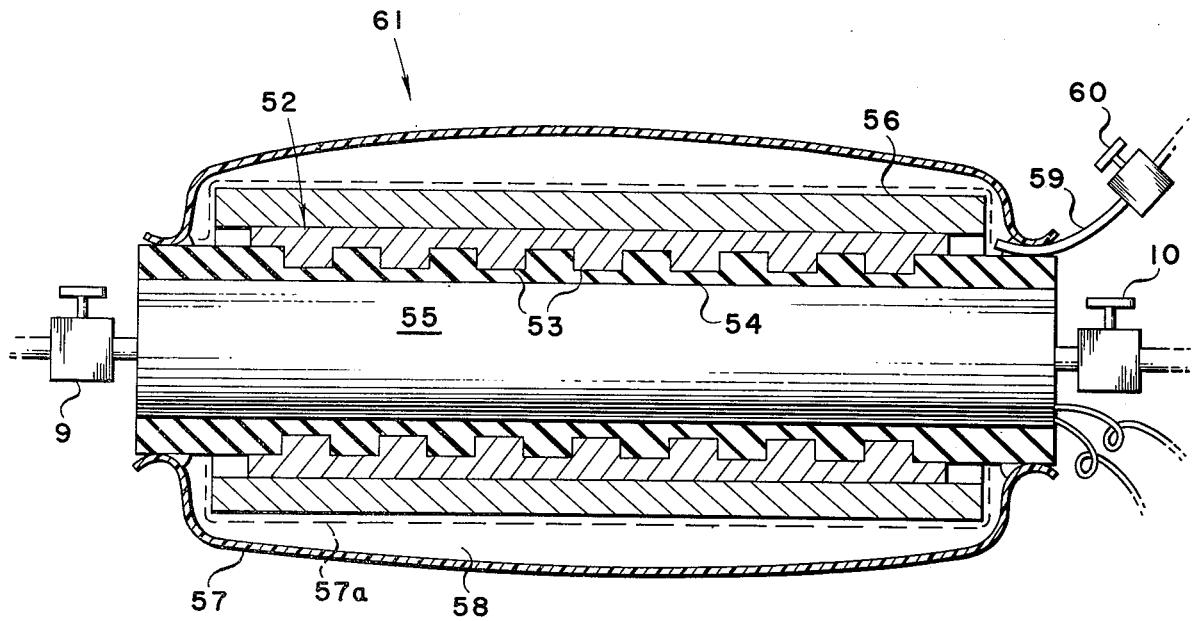
FIG. 6 is a cross-sectional view of an article layed up on an intermediate sleeve held rigid by the rigidized mandrel over which is placed the caul plates and cover.

Referring first to FIG. 1 of the drawings, there is shown for descriptive purposes a representative article 1 such as is manufactured in accordance with this method. The article 1 is essentially a tube-like structure having a wall 2 with internal reinforcements 3 at its center for stiffening purposes. An external reinforcement 4a and 4b at each end provides suitable areas for joining to adjacent structure (not shown).

Forming the Mandrel

Prior to forming an article 1 it is first necessary to fabricate a mandrel 5 having an external configuration substantially corresponding to the desired internal configuration of the article to be produced. Referring to FIG. 2 for a description of the preferred method, the mandrel 5 is cut or otherwise formed as a spongelike foam core 6, its exterior shape being similar to the desired internal configuration of the article 1. The core 6 should be uniformly undersized by a thickness equal to an impervious layer 13 of elastic material to be subsequently applied over the core. A heated wire foam cutter has been found to be useful in producing acceptable cores, although the core 6 can be cast in a mold. A preferred core material is reticulated polyurethane foam having approximately 10 pores per inch. Although a wide latitude in pore size is acceptable, reticulated foams made from other materials can be used as long as they can withstand the temperature required to cure the article and are impervious to attack by the rigidizing medium.

A pressurization means is attached to the core 6 for introducing or extracting a fluid medium. This is accomplished by boring or casting a hole 7 completely through the core 6 and installing a pressurization tube 8 through the axial length of the core so that substantial lengths of the tube protrude out through each end of the core 6, as at 8a and 8b. These tube ends are respectively adapted to mate with fluid control values 9 and 10. The central portion of the tube 8 within the core 6 has a plurality of holes 11 through its walls to allow fluid to flow to or from the interior of the core 6. Additionally, the core 6 contains a heating element or elements 12 which, when activated, cause the solidified medium within the mandrel to liquify. The heating elements can be inserted into the core 6 easily by just pushing them directly into the core. This causes some of the pore walls to be sheared but does little damage. If desired, passages for acceptance of the heating elements can be molded into the core.

The core 6 is covered with a substantially uniform impermeable elastic coating or layer 13 which, when applied, bonds to the surface of core 6. The preferred material for this layer is a room temperature vulcanizing rubber such as DC 92-048, manufactured by the Dow Corning Corporation. Another example of a suitable coating material is General Electric's RTV-360. Whatever rubber is selected, it must be capable of withstanding the temperatures required to cure the resin in the article in the uncured state and must be impervious to attack by the rigidizing medium. The curing temperature for this material can range above 350° F.

It has been found that the best way to apply the coating 13 is by brushing. The thickness of the layer 13 is not critical but it must be sufficiently thick to resist punctures that may occur in the normal wear and tear of handling and accept pressure levels to around 40 psi. It has been found that a DC 92-048 vulcanizing rubber coating thickness of approximately 0.090 inches is more than adequate. It is sometimes found that several coats must be brushed on before the proper thickness is obtained. Therefore, the core 6 is usually prepared approximately 0.090 inches undersize so that the external configuration of the coated core substantially corresponds to the interior of the article to be formed. The rubber coating is also applied over the ends of 6a and 6b of the core 6, directly over the ends 8a and 8b of the pressurization tube 8, and over the protruding ends of the heating elements 12, as at points 14a, 14b, 14c, 14d, to form an airtight bond after the layer 13 cures.

Valves 9 and 10 are then attached to the ends of the pressurization tube 8. The mandrel 5 thus formed, when pressurized by a fluid applied through the pressurization tube 8, is capable of expanding beyond its normal unpressurized dimensions. When a vacuum is pulled it collapses to a substantially smaller volume.

Rigidizing the Mandrel

Referring to FIG. 3, the complete mandrel 5, prepared as described above, is installed in a rigidizing system 15 by attaching an inlet line 16a to valve 9 and an outlet line 16b to valve 10. The rigidizing system 15 consists of a tank 17 containing a rigidizing medium 18 that is solid at room temperature and has a melting point well above any temperature that would reasonably be expected to occur in a manufacturing shop, about 110° F., for example, and yet low enough that the liquified medium will not damage the layer 13 or core 6, i.e., below 200° F., for example. Thus, there must be no possibility that the mandrel 5, once rigidized, can become soft due to temperature fluctuations normally experienced in manufacturing shops prior to the time the article is cured. It has been found that paradichlorobenzene with a melting point of 127.4° F. is quite adequate for this purpose.

The tank is connected by a line 19 to one end of a reversible pump 20. The other end of the pump 20 is connected by a line 16a to the valve 9 through a pressure gauge 22. The fluid outlet line 16b from the mandrel 5 is connected to a view port 23 through the valve 10. The view port 23, which is used for observing fluid flow, in turn is connected through a line 24 back to the tank 17. A heater 27 and insulation 28 are also provided in the line 24 for purposes to be described.

As shown in FIG. 3, a split mold 25, consisting of halves 26a and 26b, is placed around the mandrel 5 and joined together by appropriate means such as fasteners (not shown). The mold halves, when so joined, have an internal configuration exactly corresponding to the desired configuration of article 1. The mold halves may be manufactured by casting, machining, electrodeposition or any suitable method known to those skilled in the art.

A temperature slightly above that required to liquify the rigidizing medium must be maintained throughout the rigidizing system 15 and mandrel 5; for example, above 127.4° F. for paradichlorobenzene. This is accomplished by heater 27, which is wrapped around not only the line 24 but also around pump 20 and lines 19, 16a, 16b, 24; in conjunction with the heating elements 12 within mandrel 5, both of which can be activated by connection to an appropriate electrical power source (not shown). A considerable amount of time and energy can be conserved if the tank and lines are covered with insulating material such as is typically and representatively illustrated as 26.

After the paradichlorobenzene has liquified, the valves 9 and 10 are opened and the pump 20 is turned on, causing the paradichlorobenzene to flow from the tank 17 into and fill the mandrel 5. Flow is continued so that fluid flows out of the mandrel 5, through the view port 23 and back to the tank 17. This flow is maintained until all air bubbles in the flowing fluid, as viewed through the view port 23, disappear, thereby indicating that all air has been removed from the mandrel 5 and it is completely filled with paradichlorobenzene. The valve 10 is then closed, but valve 9 is left open until the pressure gauge 22 reads approximately 40 psi, a pressure sufficiently high to insure complete expansion of the mandrel 5 against the split mold 25. The valve 9 is then closed, locking the liquified paradichlorobenzene in the mandrel 5. The pump 20 and heater 27 and heating element 12 within the mandrel 5 are next turned off, permitting the liquid to cool. When the temperature of the paradichlorobenzene drops below 127.4° F. it solidifies leaving the mandrel 5 rigid. After the temperature has further reduced to a point where handling can easily be facilitated, the mold 25 is removed from around the now rigid mandrel 5, the valves 9 and 10 are disconnected from the lines 16a and 16b and the mandrel is removed from the rigidizing system 15.

It should be noted that it is not an absolute requirement that the mandrel 5 contain the heating elements 12. For example, if the mold 25 itself were to incorporate heating means (not shown), sufficient heat could be transferred into the mandrel 5 to maintain the paradichlorobenzene in a liquid condition. Nevertheless, it has been determined that the use of the heating elements 12 is more efficient and less costly than the latter approach.

Article Lay-up

The mandrel 5 is now ready for lay-up of an uncured resin-impregnated fibrous fabric, such as conventional, commercially available, glass cloth or tape, for example. The fabric can be layed up by hand in the form of sheets, strips or tape. Alternatively, the mandrel 5 can be rotatably supported at the ends of the pressurization tube 8 and the lay-up can be accomplished by automated tape winding machines. The choice of the lay-up material used to make an article will depend on the required strength and usage of the article. Most methods known in the art for the laying-up of resin-impregnated fiber articles can be used with the mandrel 5. The article 1 shown in FIG. 1 has an internal reinforcement 3 which may consist of a series of individual split rings made up of fibrous reinforced fabric layed up circumferentially, one on top of another until the desired thickness is obtained, or other suitable materials. The external reinforcements 4a and 4b may consist of a continuous circumferential wrapping of fabric tape of varying width. The wall 2 of the article may consist of layers of fabric having various fiber orientations; for example, alternating layers of fabric having fibers at 0°, 90°, and ±45° to the longitudinal axis. It must be emphasized that the article is shown for descriptive purposes only and it could conceivably consist of only a single ply of fabric.

It is desirable, but not necessary, to coat the mandrel 5 prior to lay-up of the article with a parting agent to aid in the separation of the mandrel from the article after the article has been cured. A typical parting agent that has proven successful is MS 122 fluorocarbon manufactured by the Miller Stevenson Corporation, Los Angeles, California. It is also desirable, but not necessary, to coat the interior of the envelope 29 in a similar fashion for the same reason.

It has also been found expedient is some instances, such as when the resin-impregnated fibrous fabric used to make the lay-up contains an excess of resin, to incorporate a bleeder cloth between the mandrel 5 and lay-up to absorb the excess resin during the curing cycle. A typical bleeder cloth consists of an 0.01 inch thick fiberglass cloth having no resin. The use of a bleeder cloth requires the incorporation of a teflon-coated fiberglass cloth to be placed between the bleeder cloth and lay-up in order to insure separation of the bleeder cloth from the article after curing. The total thickness of the bleeder and teflon coated fiberglass cloth is typically only 0.020 inch. Thus, their effect on the final dimensions of the cured article is insignificant for most purposes.

Preparation for Curing in an Autoclave

Again referring to FIG. 1, the mandrel 5, with the lay-up applied, is then placed in the envelope 29 which can be in the form of split mold halves or caul plates 30a and 30b appropriately joined, as by fasteners 31a and 31b, by the use of a series of holes 31c in the caul plates. Alignment pins 32 on caul plate 30b are designed to mate with holes 32a on the caul plate 30a ensuring precise alignment of the caul plates when they are joined.

Figure 4:
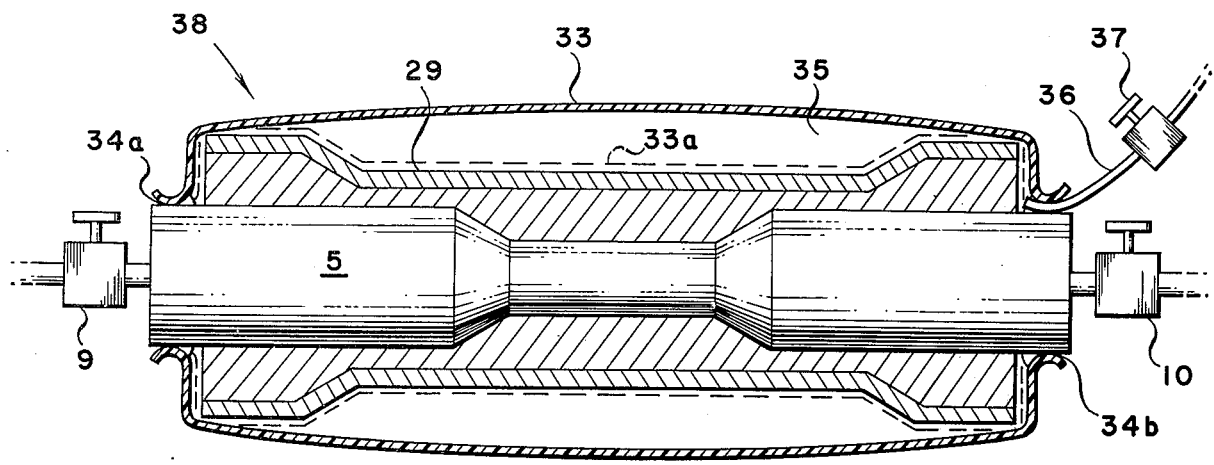
FIG. 4 is a cross-sectional view of an article layed up on the rigidized mandrel installed in the envelope and the cover placed over the envelope and sealed at its ends to the mandrel.

A flexible cover 33, shown best in FIG. 4, is to be placed over the assembled envelope 29. It must have a diameter and length greater than the envelope. This cover is made of material such as a silicone rubber sheet formed into a tube by vulcanizing the ends of the sheet together. Other means may be used to form the flexible cover 33.

In FIG. 4 the cover 33 is shown positioned over the envelope 29 containing the mandrel 5 and lay-up and is sealed to the mandrel 5 by the use of sealing putty at each end 34a and 34b of the mandrel 5, thereby cooperating with the mandrel 5 to form a container 35 around the envelope 29 and lay-up. Silicone rubber putty has proved adequate in this application. A line 36 is connected to a shut-off valve 37 and is inserted between the mandrel 5 and cover 33 at end 34b. It is sealed in place in the same manner as is the cover 33. The valve 37 is connected to a vacuum pump (not shown). With valve 37 open, the vacuum pump is activated, evacuating the container 35. This causes the cover 33 to collapse tightly to the position around the envelope 29 illustrated by the dotted lines 33a.

The complete assembly 38 shown in FIG. 4 is then installed into the rigidizing system 15 of FIG. 3. Valves 9 and 10 are opened and heating elements 12 and 25 are activated, causing the paradichlorobenzene to again liquify. After the paradichlorobenzene is liquified, the pump 20 is turned on in the reverse flow condition and the paradichlorobenzene is pumped out of the mandrel 5 and back into the tank 17. The assembly 38 is then removed from the rigidizing system with valves 9 and 10 remaining open.

Curing the Article in an Autoclave

The assembly 38 is next placed in an autoclave (not shown) for curing the lay-up. The cure cycle depends upon the type of resin used in the lay-up. Typical figures, using Thornel 300 graphite fibers, which are made by Union Carbide, New York, N.Y., impregnated with E715 resin, manufactured by U.S. Polymeric Company, Santa Ana, California, are 350° F. for 1 hour with a pressure of 100 psi. Whether or not the vacuum is continuously drawn from between the cover and mandrel during curing is dependent upon the type of resin used. If it is one that tends to give off a gas when curing, the vacuum may be maintained during the whole curing cycle, drawing out the gases produced as the resin cures. With resins that do not significantly give off gas when curing, the vacuum need not be continuously drawn. In such cases the valve 37 is closed, disconnected from the vacuum pump and attached to a line in the autoclave which is connected to ambient pressure from outside the autoclave. The valve 37 is then reopened. This ensures that a differential pressure exists between the interior of the container 35 and the interior of the autoclave when autoclave pressure is raised during the curing cycle. In the autoclave, high pressure heated air enters through the open valves 9 and 10, expanding the mandrel 5 and forcing it against the lay-up. As previously stated, the amount of pressure required depends upon the type of material making up the article. While high pressure is generally desirable, it may not be always necessary. Ambient pressure may prove sufficient. Under the latter circumstances it will be required that a vacuum be continuously drawn on the container 35 regardless of whether or not the resin out gases during curing. When the temperature has increased sufficiently that the resin begins to liquify, the lay-up is forced against the interior of the envelope and the lay-up becomes debulked; that is, any excess resin is forced out of the lay-up.

After the assembly 38 has remained in the autoclave for a time sufficient to cure the resin in the lay-up, the temperature and pressure are reduced to ambient, the assembly 38 is removed from the autoclave and the cover 33 and envelope 29 are removed from the article 1. Valve 10 is then closed and a vacuum pump (not shown) is attached to valve 9. When the vacuum is drawn it causes the mandrel 5 to collapse, after which it is easily pulled from the hollow article 1. Upon release of the vacuum, the mandrel 5 returns to its original shape and it is ready for recycling.

Curing Without an Autoclave

Referring to FIG. 5, it can be seen that it is possible and practicable to form a hollow article 1 without the use of an autoclave. The mandrel 5, manufactured in accordance with the foregoing, is installed and rigidized in the system 15 (FIG. 3), after which the article 1 is layed up thereon by the methods previously recited. A pressure envelope 39 (female mold), which, similar to the envelope 29, can consist of a pair of caul plates 40a and 40b, are placed around the lay-up and rigidized mandrel 5. The parting line of the caul plates 40a and 40b is shown as dotted line 41. The caul plates 40a and 40b are manufactured and configured similar to those of envelope 29, except that, in this instance, they extend around the contour of the ends 42a and 42b of the article and the ends 43a and 43b of the mandrel 5. The caul plates 40a and 40b also incorporate integral heating elements 44a and 44b which, when activated, are capable of supplying sufficient heat to cure the resin-impregnated fabric of the lay-up within. The caul plate 40a incorporates notches 45a and 45b, which cooperate with notches 46a and 46b on caul plate 40b, so that when the caul plates are joined a passageway for the pressurization tube 8 is formed, effectively sealing off the interior of the envelope 39. It is an important requirement that the caul plates 40a and 40b mate as tightly as possible, forming an airtight envelope 39. To aid in forming an airtight envelope 39 it has been found desirable to coat either or both caul plates 40a and 40b with a silicone rubber putty, or the like, at the parting line 41 and at the surfaces of the notches 45a, 45b, 46a and 46b. An alternate approach is to machine an O-ring groove, such as shown at 47 on the parting line and around the notches of each caul plate and insert an O-ring 47a in the grooves. Caul plate 40b contains a passageway 48 which extends from its interior to its exterior surface, exiting at a port 48a. A line 49 is connected at one end to port 48a and at the other end to a valve 50.

Since the article 1 has external reinforcements 4a and 4b which consist of continuous circumferential wrappings of fabric tape of varying thickness, and which may place the rigidized mandrel 5 under a compressive load, it is necessary to draw a vacuum between the pressure envelope 39 and mandrel 5, permitting the ambient air pressure to force the lay-up against the envelope 39 prior to derigidizing the mandrel 5 in order to prevent the possible collapse of the mandrel. This is accomplished by attaching a vacuum pump (not shown) to the valve 50 and drawing a vacuum. If no compressive load has been applied to the mandrel 5 by the lay-up, the vacuum need not be drawn.

The assembly 51 which results from the foregoing procedure is then installed in the rigidizing system 15 and the mandrel 5 is derigidized by the methods previously recited. The assembly 51 is then removed from the rigidizing system and a pressurization source (not shown) is attached to valve 9 which is open at this time. Valve 10 is closed and the pressurization source is activated, pressurizing the mandrel 5 and forcing it circumferentially outward against the lay-up. The portions of the mandrel 5 which extend beyond the lay-up are restrained from expanding by the envelope 39. The heating elements 44a and 44b are next activated, heating the assembly 51 to the curing temperature of the resin in the lay-up. As the resin begins to liquify, the lay-up is forced against the interior of the envelope 39, stretching the fibers, straightening out any kinkiness and causing it to be debulked. After the assembly 51 has been heated for a time sufficient to cure the resin in the lay-up, the heating elements 44a and 44b and the pressurization source are deactivated, reducing the temperature and pressure to ambient. The envelope 39 and mandrel 5 are then removed by the steps previously recited.

This method has the advantages of eliminating the need for an autoclave but complicates the design of the envelope 39. It further requires that the envelope be made strong enough to withstand the pressure level in the mandrel 5. The method has advantages when a large number of articles are to be produced, since the assembly 51 does not have to be moved in and out of an autoclave and the autoclave heated for each article.

The heating elements 44a and 44b may be eliminated, thereby saving costs, when the assembly 51 can be placed in an oven for curing of the lay-up. The choice depends upon the availability of an oven and the size and number of the parts to be produced.

Use of an Intermediate Sleeve

Referring to FIG. 6, an article of manufacture 52 is shown, having a multitude of reinforcements 53. It has been found to ease problems encountered in manufacturing an intensly complex product such as article 52 if an intermediate sleeve 54 is placed between a mandrel 55 and the lay-up. This results from the fact that it is difficult to uniformly coat a foam core having such an intricate surface contour. A sleeve 54 can be made by first manufacturing a sleeve mold (not shown) having an internal configuration substantially corresponding to the interior of the article 52. The sleeve mold can be a split type similar to mold 25 of FIG. 3. The interior of the sleeve mold is coated with a silicone base or fluorocarbon base parting agent, for example MS 122 fluorocarbon base parting agent manufactured by Miller Stevenson Company, Los Angeles, California. After the parting agent has dried, the interior of the sleeve mold is brush coated with a room temperature vulcanizing rubber such as that used to form the layer 13 on core 6 of the previously described mandrel 5 (FIGS. 1 and 3). The thickness of the coat is not critical, but it should be thick enough to resist punctures that may occur in the normal wear and tear of handling; 0.09 inch thickness has again been found to be adequate. It is also best to continue applying the rubber until the interior of the sleeve 54 is as smooth as possible. After the sleeve 54 has cured, the sleeve mold is removed.

A mandrel 55 is then formed to the internal dimensions of the sleeve 54 by the forming methods used to make the mandrel 5.

The sleeve 54 is slid over the mandrel 55 and both are connected to the rigidizing system 15, except that the sleeve mold is used instead of mold 25, and the mandrel 55 and sleeve 54 are rigidized by the procedure previously recited, the mandrel 55 acting as a rigid support in rigidizing this sleeve 54. The rigidized mandrel 55 and sleeve 54 are then removed from the rigidizing system 15 and the resin-impregnated fibrous fabric is layed up around the mandrel. Here, again, the type of lay-up will depend upon the end use of the article. An envelope 56 of the nature previously described is installed over the lay-up and a flexible cover 57 is placed over the envelope 56 and sealed to sleeve 54, forming a container 58 by sealing procedures previously discussed. A line 59 attached to a shutoff valve 60 is inserted between the sleeve 54 and cover 57 and is sealed in place when the cover 57 is sealed to the sleeve 54. The valve 60 is opened and the vacuum pump is activated, evacuating the container 58 and causing the cover 57 to collapse to a position 57a (shown as dotted lines) around envelope 56. The solidified paradichlorobenzene is then removed from the mandrel 5, the assembly 61, as shown in FIG. 6, is placed in an autoclave and the article 52 is cured by the methods previously described.

After the article 52 has been cured, the temperature and pressure are reduced to ambient, the cover 57, envelope 56, and mandrel 55 are removed from the assembly 61. The sleeve 54 is removed by separating it from the interior walls of the article 52 and manually pulling it out. If desired, the mandrel 55 can be removed from within the sleeve 54 after the vacuum is drawn from the container 58 prior to the insertion of the assembly 61 into the autoclave. This is possible because, once the vacuum is drawn, the mandrel 55 is no longer necessary since ambient air pressure holds the sleeve 54 and lay-up against the envelope 56.

It will be noted that the intermediate sleeve can also be used with the method for curing without an autoclave. This requires only that an envelope be used which is suitably configured to accept the sleeve, instead of using the envelope 39.

It should now be evident that this method has application for forming a wide variety of hollow parts, examples of which are ducting, shafts, or even whole aircraft fuselage sections. The advantages of low article costs, the capability of making close tolerance parts, the provision for a single stage construction or lay-up of the article's materials, and the feature of reuseability of the mandrel have been verified.

It is believed that the inventions will be understood from the foregoing detailed description of the embodiments. However, it should be clearly understood that the above descriptions and illustrations are not intended to unduly limit the scope of the appended Claims, but that the Claims should be given the broadest interpretation to which the employed language fairly admits.

Therefore, what I claim as patentably novel is:

1. A method for making a hollow, resin-impregnated fibrous article comprising the steps of:
    fabricating from a flexible, porous material a pressurizable inflatable and re-usable mandrel incorporating pressurization means for introducing into and extracting from said mandrel a liquid rigidizing medium, said mandrel having an external configuration substantially corresponding to the intended interior of the article;
    flowing a liquid rigidizing medium into the mandrel at a temperature above ambient;
    reducing to ambient temperature the liquid medium, thereby causing the medium to solidify and the mandrel to rigidize;
    assembling at least one layer of resin-impregnated fibrous material upon the rigidized mandrel;
    covering the assembled fibrous material and rigidized mandrel with an envelope having an internal configuration corresponding to the desired external configuration of the article;
    derigidizing the mandrel;
    pressurizing the interior of the mandrel to a pressure above ambient;
    heating the assembly within the envelope to a temperature above ambient for a time sufficient to cure the resin;
    reducing the temperature of the cured article to ambient temperature;
    reducing the pressure within the mandrel to ambient pressure;
    removing the envelope from the exterior of the cured article; and
    removing the mandrel from within the cured article.

2. The method of claim 1 wherein the step of fabricating the mandrel comprises:
    forming a core of reticulated foam having an external configuration substantially corresponding to but uniformly smaller than the intended interior of the article;
    installing pressurization means in the core; and
    coating the core with an impermeable layer of elastic material, forming a fluid-impervious external mandrel surface having a configuration substantially corresponding to the intended interior of the article.

3. The method of claim 2 including the additional step of installing within the core heating element means capable of heating the rigidizing medium sufficient to liquify the same.

4. The method of claim 1 wherein the step of removing the mandrel from within the cured article is accomplished by the steps comprising:
    evacuating the mandrel to cause the mandrel to collapse; and
    withdrawing the collapsed mandrel from within the cured article.

5. A method for making a hollow, resin-impregnated fibrous article comprising the steps of:
    fabricating from a flexible, porous material a pressurizable inflatable and re-usable mandrel incorporating pressurization means for introducing into and extracting from said mandrel a liquid rigidizing medium, said mandrel having an external configuration substantially corresponding to the intended interior of the article;

installing the mandrel in a mold having an internal configuration substantially conforming to the intended internal configuration of the article;

heating a rigidizing medium which is normally rigid at ambient temperature until it is liquified;

flowing the liquidized medium into the mandrel until the mandrel is filled;

sealing off the filled mandrel;

cooling the liquid rigidizing medium until it is solidified and the mandrel is thereby rigidized;

removing the mold from around the rigidized mandrel;

assembling at least one layer of resin-impregnated fibrous material upon the rigidized mandrel;

covering the assembled fibrous material and rigidized mandrel with an envelope having an internal configuration corresponding to the desired external configuration of the article;

derigidizing the mandrel;

pressurizing the interior of the mandrel to a pressure above ambient;

heating the assembly within the envelope to a temperature above ambient for a time sufficient to cure the resin;

reducing the temperature of the cured article to ambient temperature;

reducing the pressure within the mandrel to ambient pressure;

removing the envelope from the exterior of the cured article; and removing the mandrel from within the cured article.

6. The method of claim 5 wherein the rigidizing medium is paradichlorobenzene.

7. The method of claim 5 wherein the liquidized medium, when flowed into the mandrel, is pressurized to approximately 40 psi.

8. A method for making a hollow, resin-impregnated fibrous article comprising the steps of:

fabricating an inflatable and re-usable mandrel of predetermined external configuration, the mandrel incorporating pressurization means for introducing and extracting a rigidizing medium liquid above ambient temperature, but rigid at substantially ambient temperatures;

rigidizing the mandrel by introducing said liquid rigidizing medium into said mandrel at a temperature above ambient and then cooling the same to substantially ambient temperature;

assembling at least one layer of resin-impregnated fibrous material upon the rigidized mandrel;

inserting the assembled fabric and rigidized mandrel in a rigid envelope having an internal configuration substantially corresponding to the desired exterior of the article;

placing an impervious flexible cover over the envelope and sealing it therearound;

evacuating the region internally of the cover;

derigidizing the mandrel by elevating the temperature and extracting said liquid rigidizing medium;

heating the assembly above ambient temperature for a time sufficient to cure the resin;

returning the cured article to ambient temperature;

removing the cover and envelope from the exterior of the cured article; and removing the mandrel from within the cured article.

9. The method of claim 8 wherein the pressure within the mandrel is raised above ambient pressure during the step of curing and reduced to ambient after curing.

10. The method of claim 8 wherein the step of fabricating the mandrel comprises:

forming a core of reticulated foam having an external configuration substantially corresponding to, but uniformly smaller than the intended interior of the article;

installing pressurization means in the core for introducing and extracting a fluid medium into and from the core; and coating the core with an impermeable layer of elastic material, forming a fluid impervious mandrel surface having an exterior configuration substantially corresponding to the intended interior of the article.

11. The method of claim 8 wherein the step of rigidizing the mandrel comprises:

installing the mandrel in a mold having an interior substantially matching the intended internal configuration of the article;

heating a normally rigid medium until it is liquified;

flowing the liquidized medium into the mandrel until the mandrel is filled;

sealing off the filled mandrel;

cooling the liquid rigidizing medium until it is solidified, thereby rigidizing the mandrel; and removing the mold from around the rigidized mandrel.

12. The method of claim 11 wherein the rigid medium has a melting temperature within the range of about 100° F. to 200° F.

13. The method of claim 11 wherein the rigidizing medium is paradichlorobenzene.

14. The method of claim 10 including the additional step of installing heating elements within the core.

15. The method of claim 8 wherein the step of removing the mandrel from within the cured article is accomplished by the steps comprising:

attaching vacuuming means to the mandrel;

activating the vacuuming means, causing the mandrel to collapse; and withdrawing the collapsed mandrel from within the cured article.

16. A method for making a hollow, resin-impregnated fibrous article comprising the steps of:

fabricating a flexible hollow sleeve having an external configuration substantially corresponding to the intended interior configuration of the article;

fabricating an uncollapsed, non-inflated mandrel incorporating pressurization means for introducing and extracting a liquid rigidizing medium, the mandrel having an external configuration substantially corresponding to the sleeve interior;

placing the sleeve on the mandrel;

flowing a liquid rigidizing medium into the mandrel;

solidifying the medium causing the mandrel to rigidize, so as to support and rigidize the sleeve;

assembling at least one ply of resin-impregnated fibrous material upon the rigidized sleeve;

locating the assembled material and rigidized sleeve within an envelope having an internal configuration substantially corresponding to the intended exterior of the article in a mating relationship;

derigidizing the mandrel;

increasing to above ambient the pressure interiorly of the mandrel;

heating the assembled material, sleeve and envelope above ambient temperature for a time sufficient to cure the article;

returning the cured article to ambient temperature;

returning the pressure within the interior of the mandrel to ambient;

removing the mandrel from within the sleeve; and removing the sleeve from within the cured article.

17. The method of claim 16 wherein the step of fabricating the mandrel comprises:

forming a core of reticulated foam having an external configuration substantially corresponding to but uniformly smaller than the intended interior of the article;

installing pressurization means in the core for introducing and extracting a fluid medium into and from the core; and coating the core with an impermeable layer of elastic material, forming a fluid impervious mandrel surface having an exterior configuration substantially corresponding to the intended interior of the article.

18. The method of claim 17 including the additional step of installing heating elements within the core.

19. The method of claim 16 wherein the step of removing the mandrel from within the sleeve is accomplished by:

attaching evacuation means to the mandrel;

activating the evacuation means, causing the mandrel to collapse; and withdrawing the collapsed mandrel from within the cured article.

20. A method for making a hollow, resin-impregnated fibrous article comprising the steps of:

fabricating a flexible hollow sleeve having an external configuration substantially corresponding to the intended interior configuration of the article;

fabricating an uncollapsed, non-inflated mandrel incorporating pressurization means for introducing and extracting a liquid rigidizing medium, the mandrel having an external configurating substantially corresponding to the sleeve interior;

placing the sleeve on the mandrel;

installing the mandrel in a mold having substantially the intended internal configuration of the article;

heating to a liquid state a rigidizing medium;

filling the mandrel with the liquid medium;

sealing off the filled mandrel;

cooling and solidifying the liquid medium and the mandrel;

removing the mold from around the rigidized mandrel, so as to support and rigidize the sleeve;

assembling at least one ply of resin-impregnated fibrous material upon the rigidized sleeve;

locating the assembled material and rigidized sleeve within an envelope having an internal configuration substantially corresponding to the intended exterior of the article in a mating relationship;

derigidizing the mandrel;

increasing to above ambient the pressure interiorly of the mandrel;

heating the assembled material, sleeve and envelope above ambient temperature for a time sufficient to cure the article;

returning the cured article to ambient temperature;

returning the pressure within the interior of the mandrel to ambient;

removing the mandrel from within the sleeve; and removing the sleeve from within the cured article.

21. The method of claim 20 wherein the rigidizing medium is paradichlorobenzene.

22. A process for making a hollow, resin-impregnated fibrous article comprising the steps of:

fabricating a flexible, hollow sleeve having an external configuration substantially corresponding to the intended interior of the article;

fabricating a collapsible, inflatable mandrel with pressurization means therein for introducing and extracting a liquid rigidizing medium, the mandrel normally having an external configuration substantially corresponding to the interior of the sleeve;

placing the sleeve around the mandrel;

flowing a liquid rigidizing medium into the mandrel;

solidifying the medium causing the mandrel to rigidize, so as to support and rigidize the sleeve;

assembling at least one ply of resin-impregnated fibrous material upon the rigidized sleeve;

assembling the material and rigidized mandrel and sleeve into an envelope having an internal configuration substantially corresponding to the intended exterior of the article;

placing an impervious flexible cover over the envelope and sealing it to the sleeve, thereby defining a container around the envelope and assembled material;

evacuating the container;

derigidizing the mandrel;

heating the assembled material above ambient temperature for a time sufficient to cure the resin-impregnated material and define the article;

returning the cured article to ambient temperature;

removing the flexible cover and envelope from around the cured article;

removing the mandrel from within the sleeve; and removing the sleeve from within the cured article.

* * * * *